Patented Nov. 26, 1935

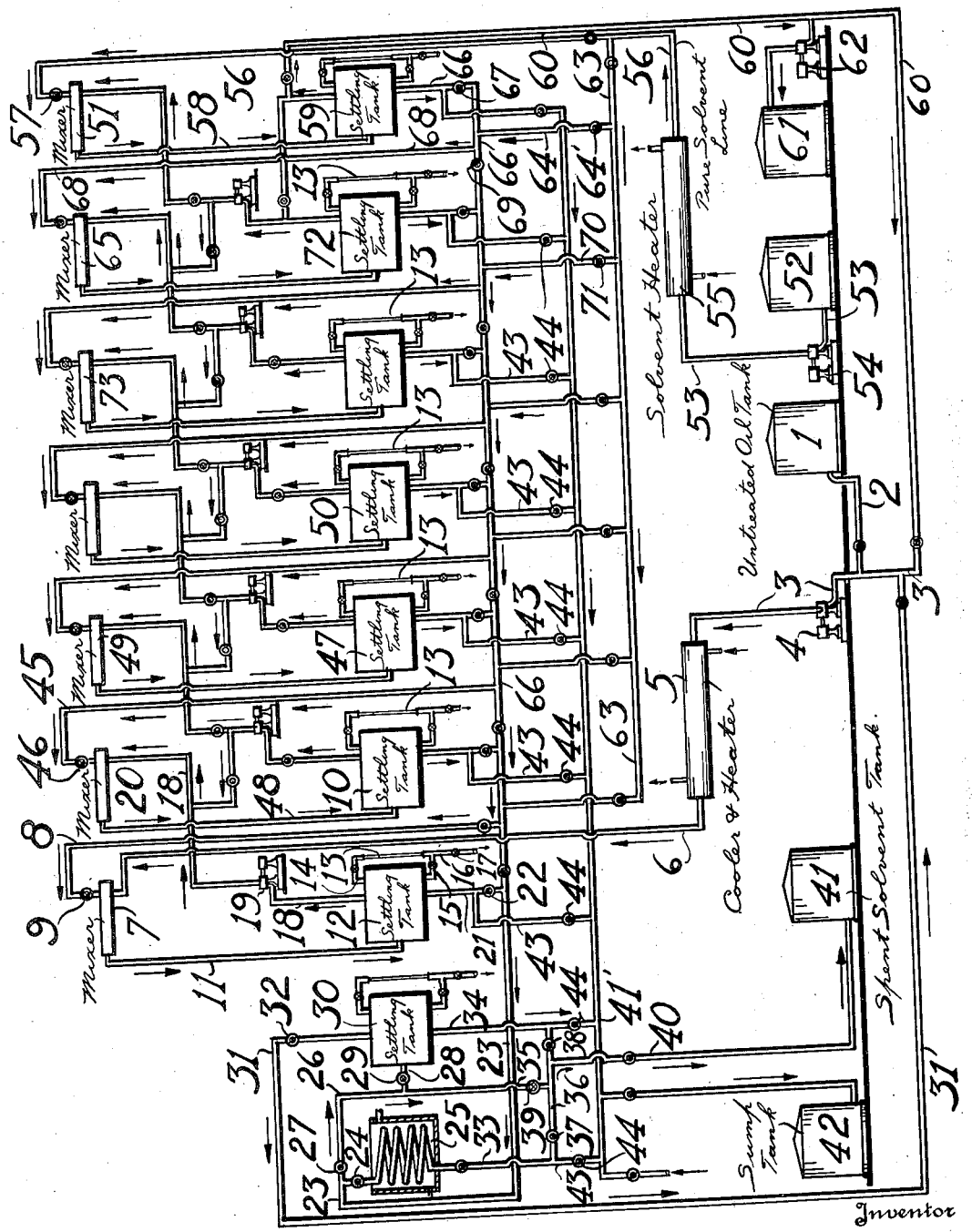

2,022,259

UNITED STATES PATENT OFFICE 2,022,259

SOLVENT EXTRACTION OF PETROLEUM DISTILLATES

John V. Starr, Elizabeth, N. J., assignor to Standard Oil Development Company, a corporation of Delaware Application November 16, 1931, Serial No. 575,241

3 Claims. (Cl. 196—13)

This invention relates to improvements in the art of using solvents in extracting undesirable components from hydrocarbon oils, especially mineral oils or mineral oil distillates.

In the treatment of mineral oils or distillates with selective solvents, such as sulphur dioxide, aniline, phenol, etc., it is well known that the efficiency of the solvent is greatly increased by applying said solvent countercurrently. In practice this countercurrent treating may be carried out in a tower in which the lighter mineral oil or petroleum fraction is charged at the bottom and the heavier solvent charged at the top, whereby the two are allowed to pass through the treating tower in countercurrent relation.

Another system used comprises a number of mixing columns and settling tanks wherein the oil is charged in at one end of the system and the solvent at the other end and the two liquids are passed through the system countercurrently. In such an apparatus the incoming fresh oil is contacted with a solvent extract which has previously been in contact a number of times with other portions of the oil and incoming pure solvent is contacted with an oil that has previously been contacted a number of times with other portions of the solvent and has received the equivalent of several treats with the solvent and solvent extract.

It is well known that the countercurrent treating of burning oils improves the burning quality for example, by increasing the gravity, reducing the sulphur content, and removing the major portion of the unsaturated and aromatic constituents. Likewise in the case of lubricating oil fractions the low quality constituents, such as aromatic and unsaturated compounds, sulphur compounds, acidic bodies, etc., are removed, thereby improving the quality by increasing gravity to a marked degree, improving the viscosity-temperature relationship as measured by the viscosity index, improving stability, etc.

In a seven-stage countercurrent treatment of oils it has been found that extreme losses occur in the last stage, that is where the fresh solvent is charged and the treated oil is removed. For example, when treating a Colombia distillate which yields approximately 60% of purified oil, it has been found that in the first six stages of the treatment an average loss of about 5% takes place at each stage, whereas in the last stage the loss will average about 10%. It has been found by taking a quantity of oil from the sixth stage of the treatment and treating with increasing quantities of solvents from 25 up to 50%, that the improvement effected by the various treats is not comparable to the loss sustained. In other words, a 25 to 50% treat of this partially purified oil will effect as much improvement in viscosity as will a 150% treat, but with considerable higher yield. The solvent is found to be relatively selective, in that when a very large volume of the fresh solvent is used to treat the partially purified oil in the seventh stage of a countercurrent treater the solvent dissolves not only the low grade constituents but in addition some of the saturated compounds. Furthermore, it has been found that a solvent containing a small quantity of extracted oil is apparently more selective as disclosed in patent application Serial Number 511,102 of J. V. Starr and G. E. Phillips.

The present invention relates more particularly to an improvement in the art of countercurrent treating of petroleum distillates, comprising feeding the solvent to the treater in a plurality of separate streams. For example, instead of applying the full amount of the solvent in the seventh stage of the treater, only ⅓ of that quantity is applied in the seventh stage. Another portion, about ⅓ of the fresh solvent plus the extract from the seventh stage, is applied to the sixth stage of the treater. The final ⅓ of the solvent plus extract from the sixth stage is fed to the fifth stage. The present invention will be fully understood from the following description and drawing which indicates suitable apparatus for carrying out the process.

The drawing is a diagrammatic view of an apparatus constructed according to the invention and indicates the flow of various materials in the process in one particular type of apparatus.

Referring to the drawing, numeral 1 indicates an untreated oil storage tank, from which oil is passed by pipe 2 to pipe 3. The oil is passed through pipe 3 by means of pump 4 to combination oil cooler and heater 5 where the temperature of the oil is regulated to that temperature suitable for treating with a solvent. Pipe 6 passes the oil to mixer 7 where the oil comes in contact with a solvent that has already been used in treating other fractions of the oil. The used solvent is passed into the mixer through pipe 8 controlled by valve 9 from the settling tank 10. Pipe 11 passes the oil to settling tank 12 from mixer 7.

The settling tanks are each fitted with a gage glass 13 with valves 14 and 15 and drain 16 on gage glass with valve 17.

The separated oil from settling tank 12 is passed through pipe 18 to mixer 20 by means of pump 19. The solvent is separately passed from settling tank 12 through pipes 21 and 23 provided with valves 22 and 24 to cooler 25. The solvent may be passed from pipe 21 through pipe 23 to pipe 26 provided with valve 27 and pipe 28 provided with valve 29 to settling tank 30. From settling tank 30 the oil separating is passed through pipe 31 provided with valve 32 to pipe 3 where it is once more passed into the system. The solvent separating in tank 30, cooled in cooler 25 or directly from pipe 26 is passed through pipes 33, 34, 35, and 36 provided with valves 37 to 39, to pipe 40 and to the spent solvent tank 41. Drain pipe 41' may be used to pass the spent solvent to sump tank 42 from each settling tank and cooler by means of pipes 43 with valves 44.

The oil in mixer 20 comes in contact with an extract and solvent that has been separated from the oil in previous treatments. The used solvent and extract is passed into mixer 20 through pipe 45 provided with valve 46 from settling tank 47. The mixed oil and solvent with extract in mixer 20, are passed by pipe 48 to settling tank 10, settled and separated. The separated solvent and extract being passed to mixer 7 to be used again in treating a fraction of untreated oil. The separated oil is passed to mixer 49 to be treated with another fraction of solvent and extract that is separated in settling tank 50.

These different steps of mixing, settling and separating of the oil and solvent with the extract take place through the seven stages of the apparatus, with oil losing a fraction of its undesirable components and the solvent taking these undesirable components in solution. After the sixth step the separated oil is passed to a seventh mixer 51 where it is brought in contact with a pure solvent. The pure solvent is passed from solvent tank 52, through pipe 53 by means of pump 54, through solvent heater 55, through pipe 56 controlled by valve 57 to mixer 51. The mixed oil and solvent are passed through pipe 58 to settling tank 59. The mixture is allowed to settle and separate in layers in settling tank 59 and the finished oil is separated and passed by pipe 60 to tank 61 by means of pump 62.

The quantity of solvent passed in mixer 51 is regulated by valve 57. In this process ⅓ of the total pure solvent that is to be used is passed to mixer 51. The remaining ⅔ are passed to different stages through pipe 63, which is used to pass the pure solvent to the various stages used in this process. In this particular operation the second ⅓ of the pure solvent is passed to mixer 65 together with the solvent and extract separated from the oil in settling tank 59 through pipe 66 controlled by valve 67. The ⅓ of pure solvent is passed through pipe 64 controlled by valve 64' to pipe 66 and through pipe 68 to mixer 65. Valve 69 on pipe line 66 is used to direct the flow of the solvents. The third quantity of ⅓ of the pure solvent is passed from pipe 63 through pipe 70 controlled by valve 71 together with the separated solvent and extract from tank 72 to mixer 73 to be brought in contact with oil separated in settling tank 50.

The quantity of pure solvent that may be introduced into the different steps of the process is thereby regulated. If the character of the oil is such that it may be advantageous to introduce the pure solvent in smaller quantities in a greater number of steps, means are here shown, where the quantities can be so regulated.

As an example of this process a Colombian lubricating distillate representing 46½ to 82½% on the crude was treated countercurrently in a seven stage treater with 150% of pure phenol. 400 parts by volume of the oil were charged in the first stage of the treater, and 600 parts of solvent charged in the seventh stage. The inspections on the purified oil from this treat are shown below in treat A. Duplicate treats on the same stock were then carried out in which 200 parts of the solvent were charged in each of the three stages, 5, 6, and 7, together with the extracts from the 6th and 7th stages charged into the 5th and 6th stages, respectively. The results of these treats are shown below in B and C which are check runs.

*Treat No. 1*

|  | Charge stock | A | B | C |
|---|---|---|---|---|
| Yield of solvent free oil |  | 60.9 | 63.2 | 62.8 |
| Gravity ° A. P. I | 21.2 | 27.3 | 27.2 | 27.3 |
| Flash ° F | 430 | 420 | 420 | 425 |
| Viscosity/100° F. Saybolt seconds | 1124 | 606 | 614 | 602 |
| Viscosity/210° F. Saybolt seconds | 75 | 66 | 66 | 65.8 |
| Viscosity index | 39 | 85 | 83 | 85 |
| Pour ° F | 10 | 20 | 20 | 20 |
| Color-Robinson | ½ | 2 | 2 | 2 |

It may be seen that the yield of the purified oil was increased 2.3% (B) and 1.9% (C), the quality improvement, gravity, viscosity index, and color remaining substantially the same.

Another example of this invention is shown in the following table. The charge stock represents a Colombian lubricating oil distillate 58 to 70% on the crude. Treat A gives the results of treating with 150% by volume of phenol at 110° F. feeding all the solvent into the seventh stage of the treater, while B and C give the results of feeding ⅓ of the total solvent into each of the three stages, #5, 6, and 7.

*Treat No. 2*

|  | Charge stock | A | B | C |
|---|---|---|---|---|
| Yield of solvent free oil |  | 67.2 | 69.4 | 69.9 |
| Gravity ° A. P. I | 20.1 | 27.0 | 27.0 | 26.8 |
| Flash ° F | 485 | 485 | 450 | 465 |
| V/100 Saybolt seconds | 2200 | 876 | 872 | 845 |
| V-210 Saybolt seconds | 103 | 77 | 77 | 76 |
| Viscosity index | 39 | 82 | 82 | 82 |
| Pour | 10 | 20 | 20 | 20 |
| Color | ½ | 2¼ | 2 | 2 |

The invention is applicable to hydrocarbon oils other than petroleum, for example coal tar oils and their distillates. Instead of phenol, mentioned in the foregoing examples, other solvents such as aniline, liquid sulfur dioxid, furfural, etc., may be used with comparable results.

The foregoing description is merely illustrative and various changes and alternative arrangements may be made within the scope of the appended claims, in which it is my intention to claim all novelty inherent in the invention as broadly as the prior art permits.

I claim:

1. The improvement in the art of solvent extraction of hydrocarbon oil by the countercurrent method, which comprises passing the oil in one direction through a plurality of treating sub-zones arranged in series, passing pure solvent to the last sub-zone and contacting the oil therewith to promote extraction of impurities from the oil by the solvent, allowing layer formation to take place, removing the oil layer and passing the solvent layer together with extracted impurities into the next prior treating sub-zone, contacting the oil and solvent to promote extraction of impurities by the solvent, allowing layer formation to take place, passing the solvent layer together with the extracted impurities into the next prior treating sub-zone and repeating the operations of contacting, settling and separating the layers until the solvent has passed through all the treating sub-zones in opposite direction to the passage of the oil therethrough, and introducing pure solvent together with the solvent containing extracted impurities into at least one of the intermediary sub-zones in the vicinity of the last sub-zone.

2. Process according to claim 1 in which pure solvent is introduced into two of said intermediary sub-zones.

3. In a process of extracting hydrocarbon oils in at least seven stages in which the oil to be treated is passed in a continuous stream through the consecutive extraction zones and the extracting agent is passed in a continuous stream through said zones in countercurrent relation to the oil, the improvement which comprises contacting the oil with the extraction agent as it is derived from later stages in at least the first four stages, then contacting the oil in at last two consecutive stages with the extraction agent as it is derived from a later stage plus fresh extraction agent, and in the last stage contacting the oil only with fresh extraction agent.

JOHN V. STARR.